United States Patent
Phillippo

(10) Patent No.: US 8,011,597 B2
(45) Date of Patent: Sep. 6, 2011

(54) AUTO A/C SOLAR COMPENSATION CONTROL

(75) Inventor: John Phillippo, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 12/209,688

(22) Filed: Sep. 12, 2008

(65) Prior Publication Data

US 2009/0078782 A1    Mar. 26, 2009

Related U.S. Application Data

(60) Provisional application No. 60/973,943, filed on Sep. 20, 2007.

(51) Int. Cl.
*B60H 1/00*    (2006.01)

(52) U.S. Cl. ............ 236/91 C; 62/157; 62/208; 62/209; 62/231

(58) Field of Classification Search ............ 62/157, 62/208, 209, 231; 236/91 C
See application file for complete search history.

(56) References Cited

U.S. PATENT DOCUMENTS

| | | | | |
|---|---|---|---|---|
| 5,072,106 A | * | 12/1991 | Osawa ........................ | 250/206.1 |
| 5,553,661 A | * | 9/1996 | Beyerlein et al. ............ | 165/203 |
| 5,704,544 A | | 1/1998 | Samukawa et al. | |
| 6,745,947 B2 | | 6/2004 | Aoki et al. | |

FOREIGN PATENT DOCUMENTS

| | | |
|---|---|---|
| JP | 62168706 | 7/1987 |
| JP | 3-159812 | 7/1991 |
| JP | 4-50024 | 2/1992 |
| JP | 4138910 | 5/1992 |
| JP | 6160179 | 6/1994 |
| JP | 9123734 | 5/1997 |
| JP | 2003211932 | 7/2003 |

* cited by examiner

*Primary Examiner* — Cheryl J Tyler
*Assistant Examiner* — Jonathan Bradford
(74) *Attorney, Agent, or Firm* — Mark E. Duell; Rankin Hill & Clark LLP

(57) ABSTRACT

A method of controlling an HVAC system to more effectively cool a vehicle cabin when the solar azimuth is large. A solar azimuth, an outside air temperature, a set temperature, a cabin temperature, and an ignition time are communicated to a controller that determines how to best operate the HVAC system. When the vehicle has only been running for a short period of time, the cabin temperature is elevated, and the solar azimuth is large, the measured solar azimuth is corrected to a corrected solar azimuth. The corrected solar azimuth is smaller than the measured solar azimuth and yields a large sun temperature. The controller then calculates a TAO based upon the large sun temperature and the TAO is used to control the HVAC system.

18 Claims, 4 Drawing Sheets

AUTO A/C SOLAR COMPENSATION CONTROL

BACKGROUND OF THE INVENTION

1. Field of the Invention

The present invention is directed toward a method for controlling a vehicle heating, ventilation, and air conditioning (HVAC) system. In particular, the present invention relates to sensing a solar azimuth and instituting appropriate measures to effectively cool an interior of the vehicle.

2. Description of Related Art

In modern vehicles it is common to have an HVAC system for an occupant compartment (hereinafter "cabin"). The HVAC system provides warm and cool air to the cabin of the vehicle and allows occupants to select a set temperature for the cabin. Once the set temperature is selected, the HVAC system will provide conditioned air to adjust the climate of the cabin.

However, many factors can affect how comfortable the interior climate feels to the vehicle occupant. For example, sunlight entering the cabin may cause the occupant to feel too warm, even with the cabin temperature adjusted to the set temperature. In order to account for these and other factors, additional sensors are typically installed in the vehicle to provide feedback to a controller of the conditions inside and outside of the vehicle.

These sensors may include for example, an outside air temperature sensor, a cabin temperature sensor, and a solar sensor. The outside air and cabin temperature sensors measure outside air and cabin temperature, respectively, while the solar sensor measures solar azimuth. Solar azimuth is the horizontal rotation angle from Due South (in the Northern Hemisphere) or from Due North (in the Southern Hemisphere) of the sun and is usually measured in degrees. As the vehicle changes direction or course, the measured solar azimuth also changes.

Frequently updated signals from the outside air, cabin, and solar sensors are transmitted to the controller. The controller utilizes these signals to determine the appropriate action to take with the HVAC system so as to effectively warm or cool the cabin. For example, when the cabin temperature is elevated and the measured solar azimuth is small, the cabin is aggressively cooled by the HVAC system. However, when the cabin temperature is elevated, but the measured solar azimuth is large, the cabin would not be as aggressively cooled.

As the vehicle may be substantially heated by the sun during non-operation and then subsequently driven in a direction in which the measured solar azimuth is large, the HVAC system may under cool the cabin. The cabin is under-cooled because the HVAC system is being controlled based upon the current measured large solar azimuth that is sensed, and not the small solar azimuth that previously heated the vehicle.

Therefore, there exists a need in the art for a method to better control the HVAC system when the measured solar azimuth is large and the cabin temperature is elevated.

SUMMARY OF THE INVENTION

The present invention is directed toward a method to properly cool a vehicle when the measured solar azimuth is large. More specifically, the present invention includes a controller that communicates with a solar sensor, an outside air temperature sensor, an ignition timer, and a cabin temperature sensor. The controller adjusts an HVAC system to change cabin temperature ($T_r$). If during the first several minutes of operation of the vehicle, the cabin temperature ($T_r$) is elevated and the measured solar azimuth ($S_a$) is large, the measured solar azimuth ($S_a$) is updated to a corrected solar azimuth ($S_a'$) that is smaller in value than the measured solar azimuth ($S_a$). The corrected solar azimuth ($S_a'$) is then used to determine a sun temperature ($T_{sun}$), which is subsequently employed to control the HVAC system. This ensures maximum cooling by the HVAC system, thereby preventing cabin under-cooling. By operating the HVAC system at a maximum, fan speed fluctuation because of vehicle direction changes are minimized.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
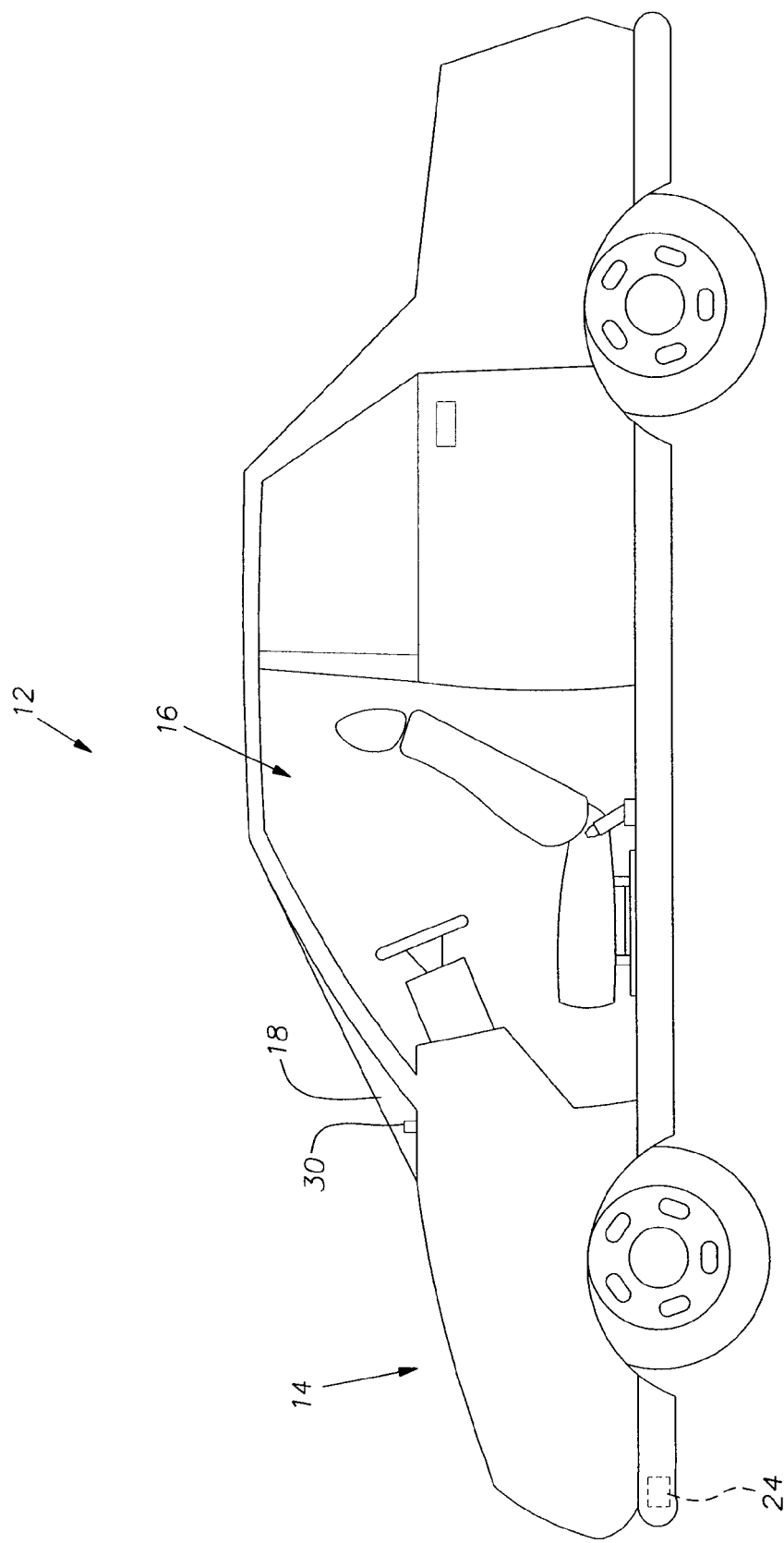
FIG. 1 is a side view of a vehicle with a climate control system installed.
Figure 2:
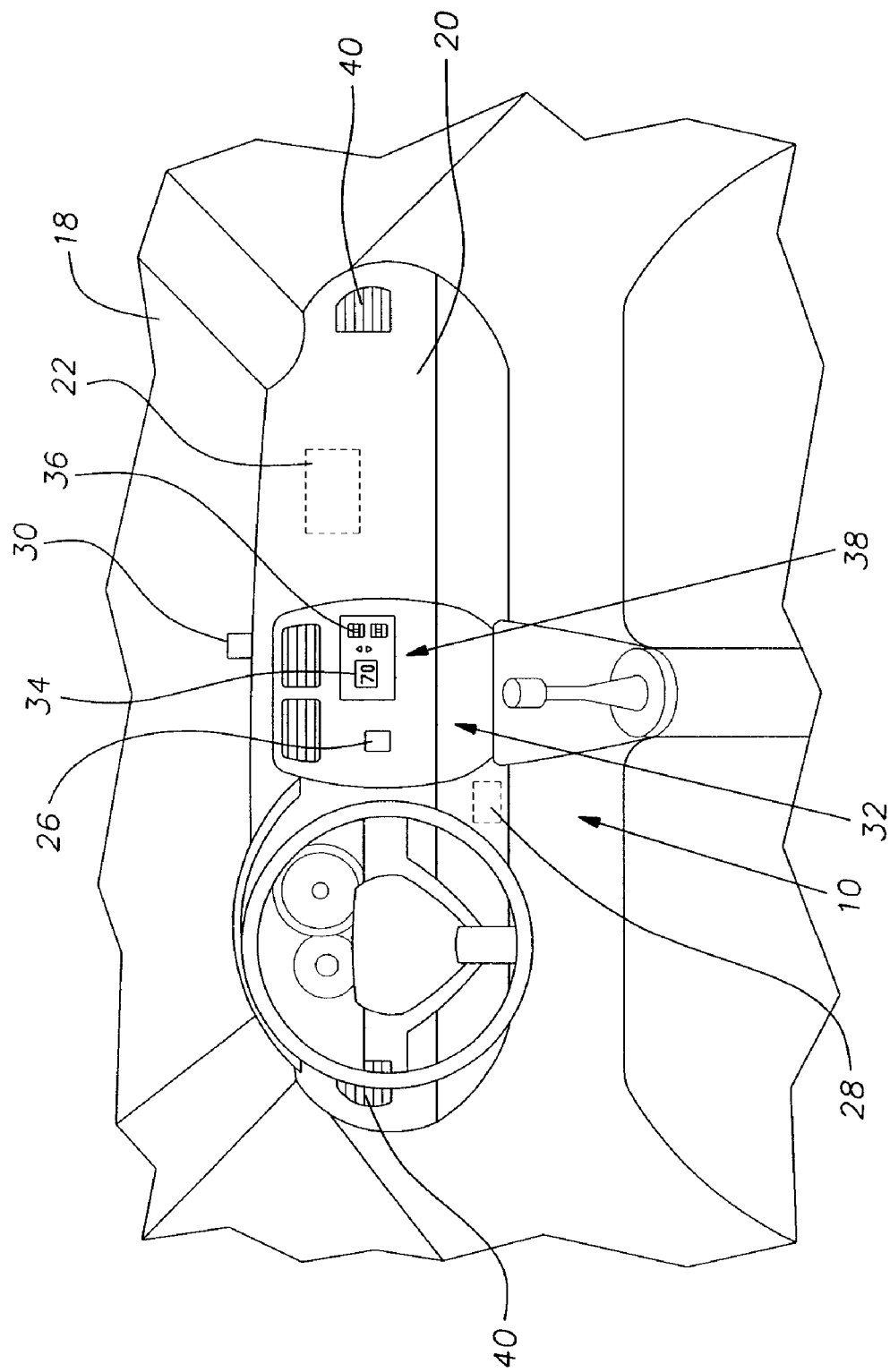
FIG. 2 is front view of an interior of the vehicle of the present invention.
Figure 3:
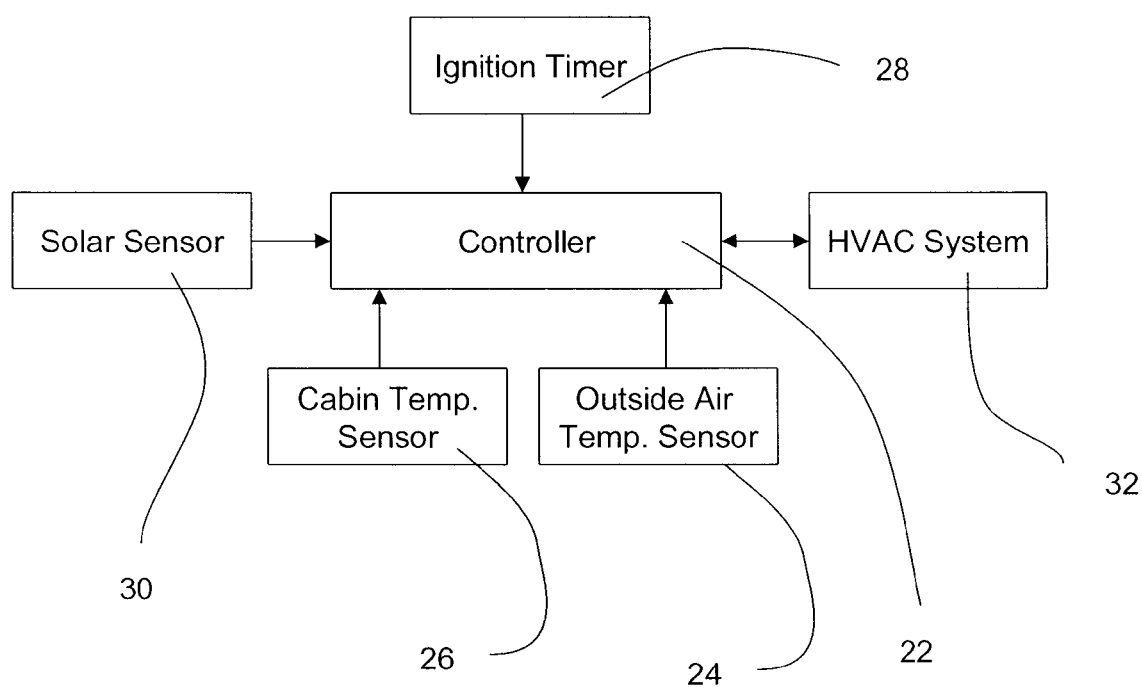
FIG. 3 is a schematic diagram illustrating the relationship between various components of the climate control system.
Figure 3:
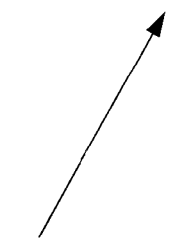

With reference to FIGS. 1-3, a climate control system 10 for a vehicle 12 according to the present invention is shown. The vehicle 12 includes an engine area 14 and a cabin 16. An occupant (not shown) would be situated in the cabin 16. A windshield 18 allows sunlight to enter the cabin 16. Further, a dashboard 20 is located in the cabin 16.

Many elements of the climate control system 10, such as a controller 22, are located behind the dashboard 20. As specifically shown in FIG. 3, an outside air temperature sensor 24, a cabin temperature sensor 26, an ignition timer 28, and a solar sensor 30, are electrically connected to the controller 22. However, other means such as wireless or fiber-optic communication to connect the controller 22 with the outside air temperature sensor 24, the cabin temperature sensor 26, the ignition timer 28, and the solar sensor 30 are also possible and contemplated.

An HVAC system 32 is also connected to the controller 22. The HVAC system 32 includes a temperature display 34, an input device 36 for changing a set temperature ($T_{set}$), a control panel 38, and outlets 40 for dispersing conditioned air. Although not illustrated, the HVAC system 32 also includes a compressor, an evaporator, a dryer, a heater core, fans, and ducts, as is known in the art. While the outlets 40 are only illustrated as being on a vertical surface of the dashboard 20, it is considered apparent that other locations in the cabin 16 offer suitable sites for placement.

The outside air temperature sensor 24 is illustrated in FIG. 1 as being disposed at a relatively forward position on the vehicle 12, and may be disposed near the engine area 14, if desired. Naturally, it is known in the art that various locations for the outside temperature sensor 24 may be selected, and therefore the present invention is not limited to the currently preferred outside temperature sensor position illustrated herein. It is noted that outside air temperature sensors are now commonly provided on vehicles, and are used, for example, to permit the occupant to display the outside air temperature ($T_{am}$) on a screen or display panel, such as the HVAC control panel 38.

The cabin temperature sensor 26 is preferably disposed on the dashboard 20 adjacent the HVAC control panel 40, as illustrated in FIG. 2. However, any commercially available cabin temperature sensor that offers a fair degree of accuracy and precision in sensing the cabin temperature ($T_r$) is suitable. Further, although it is preferred that the cabin temperature sensor 26 be disposed in the dashboard 20, this location is not necessarily mandatory. Rather, the cabin temperature sensor 26 could be moved to any number of locations within the vehicle 12. Relatively forward locations within the cabin 16 may be considered more desirable since knowing the cabin temperature ($T_r$) near the occupant is one aspect of the present invention. Further, the cabin temperature sensor 26 is disposed in a location that is relatively easy to install and electrically connect to the controller 22, without the need to introduce additional steps to the assembly process.

The ignition timer 28 is preferably disposed behind the dashboard 20 and measures how long the vehicle 12 has been operating. In particular, based upon the signals from the ignition timer 28, the controller 22 determines if the vehicle 12 has been operating for a short period of time. Typically, a short period of time is any time period less than or equal to 15 minutes. However, depending on the specific vehicle or the geographic location of the vehicle, what defines a short period of time may be adjusted.

The solar sensor 30 is generally mounted on a central portion of the dashboard 20 such that the solar sensor 30 is exposed to sunlight projecting through the windshield 18. As previously disclosed the solar sensor 30 determines the angle that the sunlight is entering the cabin 16 and communicates this information to the controller 22. The controller 22 then determines whether the measured solar azimuth ($S_a$) is large. A large measured solar azimuth is an absolute value of the measured solar azimuth ($S_a$) that is equal to or greater than 150°.

The solar azimuth ($S_a$) is inversely proportional to a sun temperature ($T_{sun}$). The sun temperature ($T_{sun}$) is a measure of the amount of sunlight entering the cabin 16. After determining the measured solar azimuth ($S_a$), the sun temperature ($T_{sun}$) is preferably determined with a lookup table that is stored in the controller 22. The sun temperature ($T_{sun}$), along with the outside air temperature ($T_{am}$), the cabin temperature ($T_r$), and the set temperature ($T_{set}$) are used to control operation of the HVAC system 32. The sun temperature ($T_{sun}$) increases in value as the solar azimuth ($S_a$) approaches 10°. Further, the sun temperature ($T_{sun}$) has a maximum value when the solar azimuth ($S_a$) is equal to 0° (e.g. when the sun is Due South in the Northern Hemisphere or when the sun is Due North in the Southern Hemisphere) and decreases to a minimum value when the sun is 180° away from Due South or Due North, respectively. Accordingly, as the solar azimuth ($S_a$) approaches 180°, the sun temperature ($T_{sun}$) decreases.

As will be appreciated, the controller 22 is incorporated into the vehicle's computer based HVAC system 32, which preferably includes several modes of operation. The controller 22, as part of the HVAC system 32 and as described hereinafter, is intended to be operational when the HVAC system 32 is operated in an automatic mode of operation and to operate seamlessly as one step or sequence of steps during the automatic mode of operation.

In such an automatic mode, the occupant selects the set temperature ($T_{set}$) and the controller 22 makes the necessary calculations, in response to signals from the outside air temperature sensor 24, the cabin temperature sensor 26, the ignition timer 28, the solar sensor 30 and one or more predefined programs defining operational characteristics of the HVAC system 32, tuned to the inherent physical characteristics of the vehicle 12. During the automatic HVAC control mode, the activation of the air conditioning (A/C), heater, vent control or activation, and fan speed modulation is automatically controlled in accordance with a computer algorithm that is stored in the controller 22.

The HVAC control panel 40 may be a series of individual pushbuttons or, preferably, may be provided as a touch screen wherein the occupant may control operation of the HVAC system 32 via one or more on-screen menus. For example, in addition to the set temperature ($T_{set}$), the occupant may select the mode of operation (full auto/semi-auto/manual); air conditioning (A/C) operation; heater operation; fresh air/recirculation; as well as select air flow outlets 40 (i.e. via defrost vents, dashboard vents, floor vents, or one or more combinations when in the manual or semi-auto mode of operation). When in a full-auto mode of operation, the occupant generally inputs the desired set temperature ($T_{set}$) and the HVAC system 32 responds to sensed conditions in accordance with a predetermined computer algorithm to appropriately activate the HVAC system 32. Naturally, the touch screen may provide various other functions, such as a navigation screen and entertainment center, as is well known in the art.

The controller 22 determines whenever the cabin temperature ($T_r$) is elevated. This is accomplished by monitoring cabin temperature ($T_r$), as sensed by the cabin temperature sensor 26. Whenever the cabin temperature ($T_r$) is greater than about 33° C. (approximately 91° F.), the cabin temperature ($T_r$) is considered elevated. However, depending on the specific vehicle 12, what defines an elevated cabin temperature ($T_r$) may be adjusted to better control the HVAC system 32.

The present invention introduces one or more further algorithms, to be described hereinafter, that will be used in conjunction with existing algorithms used during control of the HVAC system 32 in the automatic mode of operation. The one or more further algorithms of the present invention are designed to automatically adjust for under-cooling of the cabin 16 when the measured solar azimuth ($S_a$) is large, and to appropriately activate the HVAC system 32 (A/C power, vent control, fan speed) in response thereto. Insofar as the basic operational characteristics of HVAC systems are generally well known in the art, such basic operational characteristics and methods will only be described hereinafter as they relate to the climate control system 10 and method of the present invention.

Based upon inputs from the outside air temperature sensor 24, the cabin temperature sensor 26, the ignition timer 28 and the solar sensor 30, the controller 22 communicates with the HVAC system 32 the appropriate action to be initiated. For example, when the vehicle 12 has only been operating for a short period of time, the cabin temperature ($T_r$) is elevated, and the measured solar azimuth ($S_a$) is large, the controller 22 corrects the measured solar azimuth ($S_a$) to a corrected solar azimuth ($S_a'$) to be used when a TAO is calculated. Specifically, the corrected solar azimuth ($S_a'$) is less than the measured solar azimuth ($S_a$) and more specifically, is equal to 0°. Alternatively, if the vehicle 12 has been operating for a long period of time, the cabin temperature ($T_r$) is not elevated, or if the measured solar azimuth ($S_a$) is not large, the controller 22 uses the measured solar azimuth ($S_a$) when calculating the temperature at outlet (TAO).

In this regard it is noted that the TAO is a calculated value of outlet temperature, a term that is well known in the art and may be based upon a number of parameters, such as sensed cabin temperature ($T_r$), solar azimuth ($S_a$), outside air temperature ($T_{am}$), etc., but is primarily based upon the desired cabin temperature set temperature ($T_{set}$) input by the occupant. It is also known in the art that the calculated outlet temperature (TAO) is commonly used in the automatic mode of operation to control fan speed and vent selection. This control setting can be modified in some portions of the control system 10 to provide for improved response, so as to help achieve a desired level of perceived comfort on the part of the occupant in the vehicle cabin. The target temperature (TAO) of the air-conditioning air discharged from the outlets 40, is determined through the use of the following equation (1):

$$TAO = K_{set} \times T_{set} - K_r \times T_r - K_{am} \times T_{am} - K_{sun} \times T_{sun} + C \tag{1}$$

where $T_{set}$ is the set temperature of the air within the cabin, $T_r$ is the temperature of the air within the cabin, $T_{am}$ is the temperature of the air outside of the cabin, $T_{sun}$ is the amount of sunlight coming into the cabin, and $K_{set}$, $K_r$, $K_{am}$, $K_{sun}$, and C denote constants.

For example, the set temperature ($T_{set}$) is communicated from the HVAC system 32 to the controller 22, and the cabin temperature ($T_r$) is communicated from the cabin temperature sensor 26 to the controller 22. Further, the outside air temperature ($T_{am}$) and the measured solar azimuth ($S_a$) are communicated from the outside air temperature sensor 24 and the solar sensor 30, respectively, to the controller 22. If the vehicle 12 is only operating for a short period of time, the cabin temperature ($T_r$) is elevated, and the measured solar azimuth ($S_a$) is large, the measured solar azimuth ($S_a$) will be updated to the corrected solar azimuth ($S_a'$). Then preferably with a lookup table, the sun temperature ($T_{sun}$) is determined, which is based upon the corrected solar azimuth ($S_a'$). After determining the sun temperature ($T_{sun}$), the TAO is calculated and the HVAC system 32 is controlled based upon the TAO.

As the corrected solar azimuth ($S_a'$) is equal to 0°, and as previously mentioned, is inversely proportional to the sun temperature ($T_{sun}$), a large sun temperature ($T_{sun}$) value would be used in the calculation of the TAO in the present example. Therefore, the calculated TAO is smaller in value than if the measured solar azimuth ($S_a$), and hence the small sun temperature ($T_{sun}$), was used to calculate the TAO. Accordingly, the cabin 16 is more aggressively cooled when the corrected solar azimuth ($S_a'$) is used, as opposed to when the measured solar azimuth ($S_a$) is used to calculate the TAO. Further, by utilizing the corrected solar azimuth ($S_a'$), the occupant is not exposed to fan speed fluctuations as the vehicle 12 changes direction or course.

Figure 4:
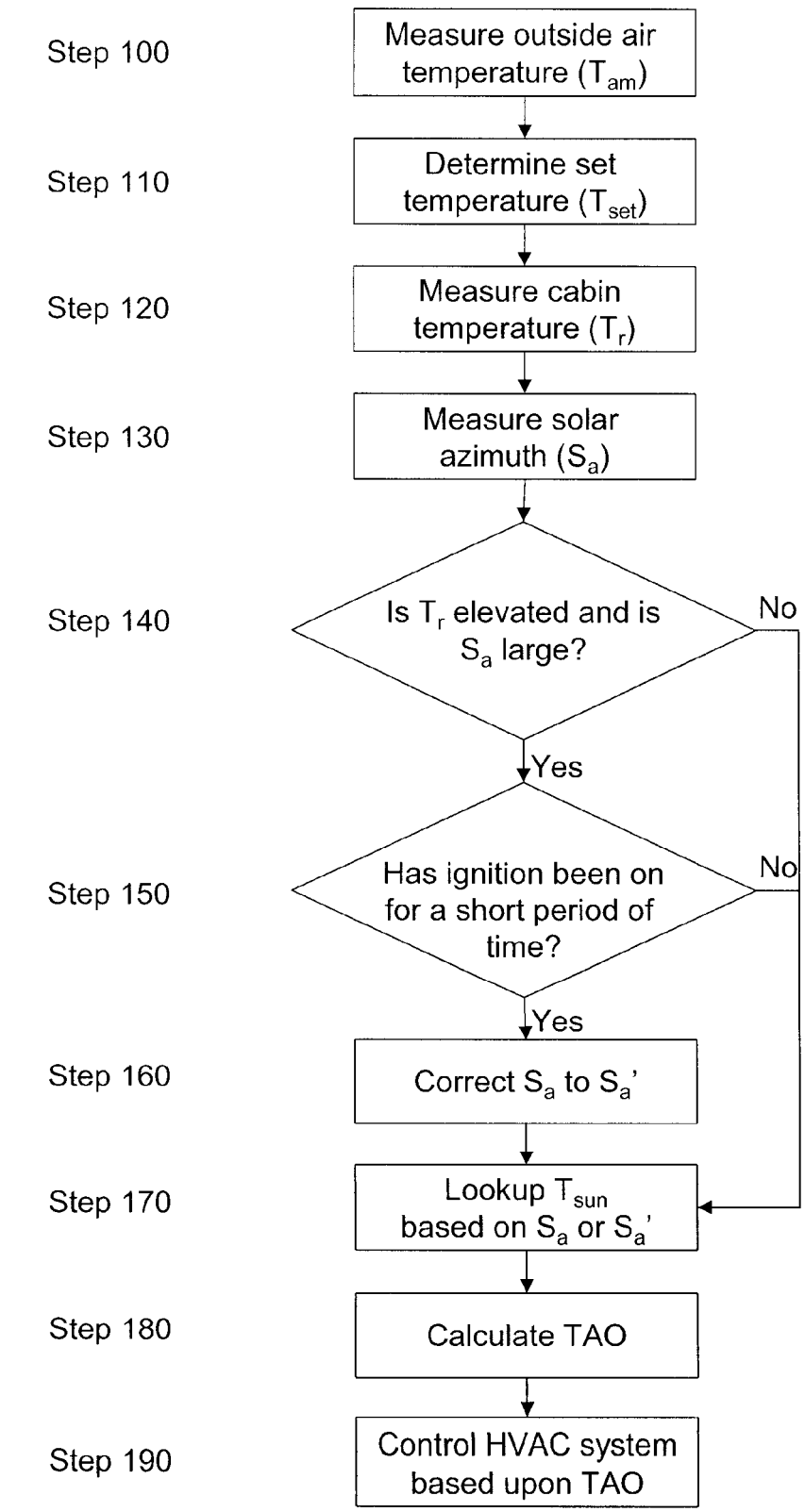
FIG. 4 is a flowchart illustrating a method of using the present invention.

A method of using the present invention is illustrated in FIG. 4. The outside air temperature ($T_{am}$), the set temperature ($T_{set}$), the cabin temperature ($T_r$), and the measured solar azimuth ($S_a$) are measured or determined in Steps 100-130, respectively. During Step 140, the controller 22 determines if the cabin temperature ($T_r$) is elevated (greater than a predetermined temperature) and if the measured solar azimuth ($S_a$) is large (i.e. greater than a predetermined value). If the cabin temperature ($T_r$) is elevated and the measured solar azimuth ($S_a$) is large, the controller 22 determines if the ignition has been on for a short period of time (i.e. less than a predetermined time period) (Step 150). During Step 160, if the ignition has been on for a short period of time, the measured solar azimuth ($S_a$) is corrected to the corrected solar azimuth ($S_a'$), which may be 0° (Step 160). Alternatively, if the controller 22 determines that the cabin temperature ($T_r$) is not elevated (less than a predetermined temperature), the measured solar azimuth ($S_a$) is not large (i.e. less than a predetermined value), or that the ignition has not been on for a short period of time (time of operation greater than a predetermined time period), the measured solar azimuth ($S_a$) is not corrected. In Step 170, the sun temperature ($T_{sun}$) is determined based upon either the measured or the corrected solar azimuth ($S_a$, $S_a'$). Then, the TAO is calculated and used to control the HVAC system 32 (Steps 180, 190).

The present invention prevents rapid fluctuations of the HVAC system 32 as the vehicle 12 changes direction or course. Thus, the occupant does not become annoyed with the fan changing speeds as the vehicle 12 changes direction. Further, the present invention ensures that the vehicle 12 is effectively cooled after being heated by the sun, even if the vehicle 12 subsequently travels in a direction that results in a large measured solar azimuth ($S_a$).

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims.

What is claimed is:

1. A method for controlling a vehicle HVAC system to cool a vehicle cabin comprising:
    measuring a time of operation of the vehicle;
    determining an angle at which sunlight is entering the cabin;
    determining a measured solar azimuth—value—based on the angle at which sunlight is entering the cabin;
    determining whether to correct the measured solar azimuth—value—to a corrected solar azimuth—value, wherein the determination of whether to correct the measured solar azimuth value is—based—on—the measured time of operation;
    upon determining that the measured solar azimuth—value—is to be corrected, correcting the measured solar azimuth—value—to the corrected solar azimuth—value—based on the measured time of operation;
    determining a sun temperature based on at least one of the measured solar azimuth—value—and the corrected solar azimuth—value—; and
    operating the HVAC system in accordance with a predetermined algorithm based upon the determined sun temperature.

2. The method of claim 1, wherein correcting the measured solar azimuth—value—further includes correcting the measured solar azimuth—value—to the corrected solar azimuth—value—based on whether the measured amount of time is less than a predetermined amount of time.

3. The method of claim 2, wherein determining whether to correct the measured solar azimuth—value—to a corrected solar azimuth—value—is further based on the measured solar azimuth—value—, and wherein correcting the measured solar azimuth—value—further includes correcting the measured solar azimuth—value—to the corrected solar azimuth—value—based on whether the measured solar azimuth—value—is greater than a predetermined angle.

4. The method of claim 3, further comprising: measuring an interior air temperature of the cabin; wherein determining whether to correct the measured solar azimuth—value—to a corrected solar azimuth—value—is further based on the measured interior air temperature; and wherein correcting the measured solar azimuth—value—further includes correcting the measured solar azimuth—value—to the corrected solar azimuth—value—based on whether the measured interior air temperature is greater than a predetermined temperature.

5. The method of claim 4,—wherein—determining a sun temperature based on one of the measured solar azimuth—value—and the corrected solar azimuth—value—further includes determining the sun temperature based on the measured solar azimuth—value—when the measured operation time is greater than a predetermined time.

6. The method of claim 5, wherein determining a sun temperature based on one of the measured solar azimuth—value—and the corrected solar azimuth—value—further includes determining the sun temperature based on the interior air temperature being less than a predetermined temperature.

7. The method of claim 6, wherein determining a sun temperature based on one of the measured solar azimuth—value—and the corrected solar azimuth—value—further includes determining the sun temperature based on the measured solar azimuth—value—being less than a predetermined angle.

8. The method of claim 1, wherein determining whether to correct the measured solar azimuth—value—to a corrected solar azimuth—value—is further based on the measured solar azimuth, and wherein correcting the measured solar azimuth—value—further includes correcting the measured solar azimuth—value—to the corrected solar azimuth—value—based on whether the measured solar azimuth—value—is greater than a predetermined angle.

9. The method of claim 1, further comprising: measuring an interior air temperature of the cabin; wherein determining whether to correct the measured solar azimuth—value—to a corrected solar azimuth—value—is further based on the measured interior air temperature; and wherein correcting the measured solar azimuth—value—further includes correcting the measured solar azimuth—value—to the corrected solar azimuth—value—based on whether the measured interior air temperature is greater than a predetermined temperature.

10. The method of claim 1,—wherein—determining a sun temperature based on one of the measured solar azimuth—value—and the corrected solar azimuth—value—further includes determining the sun temperature based on the measured solar azimuth—value—when the measured operation time is greater than a predetermined time.

11. The method of claim 10, wherein determining a sun temperature based on one of the measured solar azimuth—value—and the corrected solar azimuth—value—further includes determining the sun temperature based on the interior air temperature being less than a predetermined temperature.

12. The method of claim 11, wherein determining a sun temperature based on one of the measured solar azimuth—value—and the corrected solar azimuth—value—further includes determining the sun temperature based on the measured solar azimuth—value—being less than a predetermined angle.

13. The method of claim 1, wherein determining a sun temperature based on one of the measured solar azimuth—value—and the corrected solar azimuth—value—further includes determining the sun temperature based on the interior air temperature being less than a predetermined temperature.

14. A method for controlling a vehicle HVAC system to cool a vehicle cabin comprising:
measuring an interior air temperature of the vehicle;
determining an angle at which sunlight is entering the cabin;
determining a measured solar azimuth—value—based on the angle at which sunlight is entering the cabin;
determining whether to correct the measured solar azimuth—value—to a corrected solar azimuth—value, wherein the determination of whether to correct the measured solar azimuth value is—based—on—the measured interior air temperature;
upon determining that the measured solar azimuth—value—is to be corrected, correcting the measured solar azimuth—value—to the corrected solar azimuth—value—based on the measured interior air temperature;
determining a sun temperature based on at least one of the measured solar azimuth—value—and the corrected solar azimuth—value—; and
operating the HVAC system in accordance with a predetermined algorithm based upon the determined sun temperature.

15. The method of claim 14, further comprising: measuring a time of operation for the vehicle; wherein determining whether to correct the measured solar azimuth—value—to a corrected solar azimuth—value—is further based on the measured time of operation; and wherein correcting the measured solar azimuth—value—further includes correcting the measured solar azimuth—value—to the corrected solar azimuth—value—based on the measured the measured time of operation.

16. The method of claim 15, wherein correcting the measured solar azimuth—value—further includes correcting the measured solar azimuth—value—to the corrected solar azimuth—value—based on whether the measured amount of time is less than a predetermined amount of time.

17. The method of claim 14, wherein determining a sun temperature based on one of the measured solar azimuth—value—and the corrected solar azimuth—value—further includes determining the sun temperature based on the interior air temperature being less than a predetermined temperature.

18. The method of claim 14,—wherein—determining a sun temperature based on one of the measured solar azimuth—value—and the corrected solar azimuth—value—further includes determining the sun temperature based on the measured solar azimuth—value—when the measured operation time is greater than a predetermined time.

* * * * *

UNITED STATES PATENT AND TRADEMARK OFFICE
CERTIFICATE OF CORRECTION

| | |
|---|---|
| PATENT NO. | : 8,011,597 B2 |
| APPLICATION NO. | : 12/209688 |
| DATED | : September 6, 2011 |
| INVENTOR(S) | : John Phillippo |

It is certified that error appears in the above-identified patent and that said Letters Patent is hereby corrected as shown below:

In claim 1, col. 6, line 26, please remove "—" prior to and after the word "value".
In claim 1, col. 6, line 29, please remove "—" prior to and after the first occurrence of the word "value".
In claim 1, col. 6, line 29, please remove "—" prior to the second occurrence of the word "value".
In claim 1, col. 6, line 31, please remove "—" prior to and after the word "based".
In claim 1, col. 6, line 31, please remove "—" prior to the word "the".
In claim 1, col. 6, line 33, please remove "—" after the word "azimuth".
In claim 1, col. 6, line 34, please remove "—" after the word "value".
In claim 1, col. 6, line 35, please remove "—" prior to and after the word "value".
In claim 1, col. 6, line 35, please remove "—" after the word "azimuth".
In claim 1, col. 6, line 36, please remove "—" after the word "value".
In claim 1, col. 6, line 38, please remove "—" prior to and after the word "value".
In claim 1, col. 6, line 39, please remove "—" prior to and after the word "value".
In claim 2, col. 6, line 44, please remove "—" prior to and after the word "value".
In claim 2, col. 6, line 45, please remove "—" prior to and after the word "value".
In claim 2, col. 6, line 46, please remove "—" prior to and after the word "value".
In claim 3, col. 6, line 49, please remove "—" prior to and after the word "value".
In claim 3, col. 6, line 50, please remove "—" prior to and after the word "value".
In claim 3, col. 6, line 51, please remove "—" prior to and after the word "value".
In claim 3, col. 6, line 52, please remove "—" prior to and after the word "value".
In claim 3, col. 6, line 53, please remove "—" prior to and after the word "value".
In claim 3, col. 6, line 54, please remove "—" prior to and after the word "value".
In claim 3, col. 6, line 55, please remove "—" prior to and after the word "value".
In claim 4, col. 6, line 58, please remove "—" prior to and after the word "value".
In claim 4, col. 6, line 59, please remove "—" prior to and after the word "value".
In claim 4, col. 6, line 61, please remove "—" prior to and after the word "value".
In claim 4, col. 6, line 62, please remove "—" prior to and after the word "value".
In claim 4, col. 6, line 63, please remove "—" prior to and after the word "value".
In claim 5, col. 6, line 65, please remove "—" prior to and after the word "wherein".

Signed and Sealed this
Twenty-eighth Day of February, 2012

David J. Kappos
*Director of the United States Patent and Trademark Office*

CERTIFICATE OF CORRECTION (continued)
U.S. Pat. No. 8,011,597 B2

In claim 5, col. 6, line 66, please remove "—" after the word "azimuth".
In claim 5, col. 6, line 67, please remove "—" after the first occurrence of the word "value".
In claim 5, col. 6, line 67, please remove "—" prior to and after the second occurrence of the word "value".
In claim 5, col. 7, line 2, please remove "—" prior to and after the word "value".
In claim 6, col. 7, line 5, please remove "—" after the word "azimuth".
In claim 6, col. 7, line 6, please remove "—" after the first occurrence of the word "value".
In claim 6, col. 7, line 6, please remove "—" prior to and after the second occurrence of the word "value".
In claim 7, col. 7, line 11, please remove "—" after the word "azimuth".
In claim 7, col. 7, line 12, please remove "—" after the first occurrence of the word "value".
In claim 7, col. 7, line 12, please remove "—" prior to and after the second occurrence of the word "value".
In claim 7, col. 7, line 14, please remove "—" prior to and after the word "value".
In claim 8, col. 7, line 17, please remove "—" prior to and after the word "value".
In claim 8, col. 7, line 18, please remove "—" prior to and after the word "value".
In claim 8, col. 7, line 20, please remove "—" prior to and after the word "value".
In claim 8, col. 7, line 21, please remove "—" prior to and after the word "value".
In claim 8, col. 7, line 21, please remove "—" after the word "azimuth".
In claim 8, col. 7, line 22, please remove "—" after the word "value".
In claim 8, col. 7, line 22, please remove "—" after the word "azimuth".
In claim 8, col. 7, line 23, please remove "—" after the word "value".
In claim 9, col. 7, line 26, please remove "—" prior to and after the word "value".
In claim 9, col. 7, line 27, please remove "—" prior to and after the word "value".
In claim 9, col. 7, line 29, please remove "—" prior to and after the word "value".
In claim 9, col. 7, line 30, please remove "—" prior to and after the word "value".
In claim 9, col. 7, line 31, please remove "—" prior to and after the word "value".
In claim 10, col. 7, line 33, please remove "—" prior to and after the word "wherein".
In claim 10, col. 7, line 34, please remove "—" after the word "azimuth".
In claim 10, col. 7, line 35, please remove "—" after the first occurrence of the word "value".
In claim 10, col. 7, line 35, please remove "—" prior to and after the second occurrence of the word "value".
In claim 10, col. 7, line 37, please remove "—" prior to and after the word "value".
In claim 11, col. 7, line 40, please remove "—" after the word "azimuth".
In claim 11, col. 7, line 41, please remove "—" after the first occurrence of the word "value".
In claim 11, col. 7, line 41, please remove "—" prior to and after the second occurrence of the word "value".
In claim 12, col. 7, line 46, please remove "—" after the word "azimuth".
In claim 12, col. 7, line 47, please remove "—" after the first occurrence of the word "value".
In claim 12, col. 7, line 47, please remove "—" prior to and after the second occurrence of the word "value".
In claim 12, col. 7, line 49, please remove "—" prior to and after the word "value".

CERTIFICATE OF CORRECTION (continued)
U.S. Pat. No. 8,011,597 B2

In claim 13, col. 7, line 52, please remove "—" after the word "azimuth".
In claim 13, col. 7, line 53, please remove "—" after the first occurrence of the word "value".
In claim 13, col. 7, line 53, please remove "—" prior to and after the second occurrence of the word "value".
In claim 14, col. 8, line 9, please remove "—" prior to and after the word "value".
In claim 14, col. 8, line 12, please remove "—" prior to and after the first occurrence of the word "value".
In claim 14, col. 8, line 12, please remove "—" prior to the second occurrence of the word "value".
In claim 14, col. 8, line 14, please remove "—" prior to and after the word "based".
In claim 14, col. 8, line 14, please remove "—" after the word "on".
In claim 14, col. 8, line 16, please remove "—" after the word "azimuth".
In claim 14, col. 8, line 17, please remove "—" after the word "value".
In claim 14, col. 8, line 18, please remove "—" prior to and after the word "value".
In claim 14, col. 8, line 18, please remove "—" after the word "azimuth".
In claim 14, col. 8, line 19, please remove "—" after the word "value".
In claim 14, col. 8, line 21, please remove "—" prior to and after the word "value".
In claim 14, col. 8, line 22, please remove "—" prior to and after the word "value".
In claim 15, col. 8, line 28, please remove "—" prior to and after the word "value".
In claim 15, col. 8, line 29, please remove "—" prior to and after the word "value".
In claim 15, col. 8, line 31, please remove "—" prior to and after the word "value".
In claim 15, col. 8, line 32, please remove "—" prior to and after the word "value".
In claim 15, col. 8, line 33, please remove "—" prior to and after the word "value".
In claim 16, col. 8, line 36, please remove "—" prior to and after the word "value".
In claim 16, col. 8, line 37, please remove "—" prior to and after the word "value".
In claim 16, col. 8, line 38, please remove "—" prior to and after the word "value".
In claim 17, col. 8, line 41, please remove "—" after the word "azimuth".
In claim 17, col. 8, line 42, please remove "—" after the first occurrence of the word "value".
In claim 17, col. 8, line 42, please remove "—" prior to and after the second occurrence of the word "value".
In claim 18, col. 8, line 46, please remove "—" prior to and after the word "wherein".
In claim 18, col. 8, line 48, please remove "—" prior to and after the first occurrence of the word "value".
In claim 18, col. 8, line 48, please remove "—" prior to and after the second occurrence of the word "value".
In claim 18, col. 8, line 50, please remove "—" prior to and after the word "value".